June 4, 1968 — J. J. McCARTHY — 3,386,137
RELEASABLE PIN ASSEMBLAGE
Filed Feb. 2, 1966
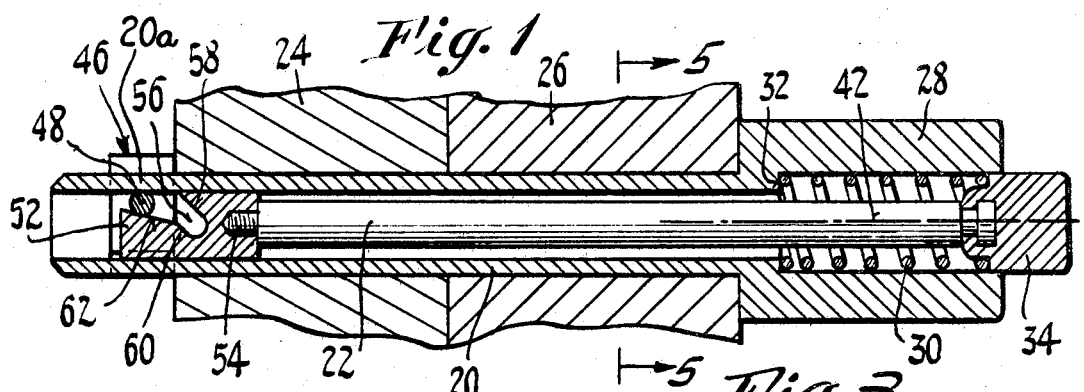
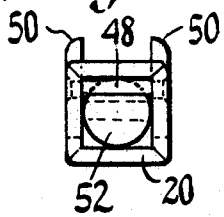
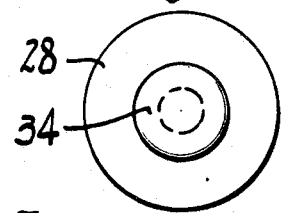
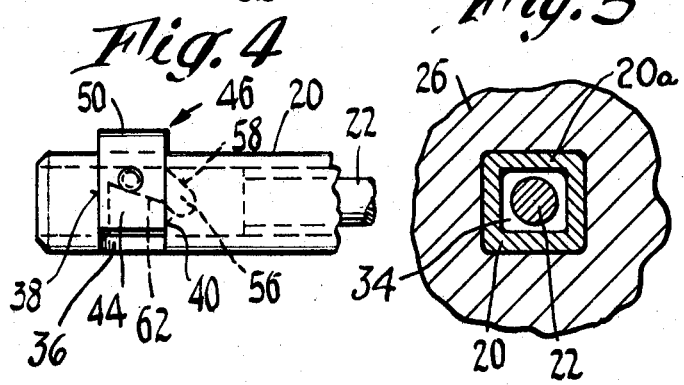
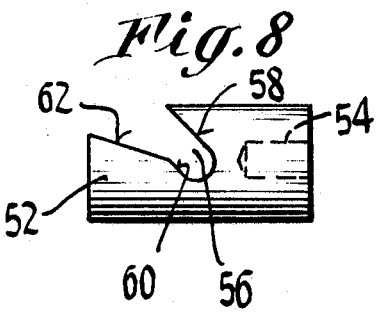
INVENTOR.
John J. McCarthy
BY
*H. Gibson Lehmann*
AGENT

United States Patent Office 3,386,137
Patented June 4, 1968

3,386,137
RELEASABLE PIN ASSEMBLAGE
John J. McCarthy, Weston, Conn., assignor to Norco, Inc., Ridgefield, Conn., a corporation of Connecticut
Filed Feb. 2, 1966, Ser. No. 524,647
3 Claims. (Cl. 24—211)

ABSTRACT OF THE DISCLOSURE

A clevis pin comprising a hollow shank having a head at one end, with a movable release button which is connected to a release rod passing through the shank. A laterally projectable abutment is disposed at the other shank end, having a camming connection with the release rod whereby the latter can project or retract the abutment. A spring acting on the release rod causes the camming connection to be under continual force, preventing looseness of the abutment.

---

This invention relates to releasable pins such as clevis pins, locking pins and the like.

The invention concerns improvements in the locking pin structures disclosed and claimed in my Patent No. 3,184,816 dated May 25, 1965 and entitled, "Quick-Release Fastening and Locking Device."

In these prior devices a slide cam in a shank projected a locking member, to protrude laterally from the shank. Somewhat close dimensional tolerances had to be observed, as with interfitting parts. The locking member was maintained in the projecting position by the cam, with usual looseness being present due to necessary sliding tolerances and clearances normally required in a mechanical assemblage of relatively movable parts.

Objects of the present invention are to provide a novel and improved locking pin structure of the type identified, and wherein less-close tolerances are needed and wherein looseness, rattle and the like are largely eliminated, especially in connection with the locking member; to provide an improved construction as above, which is especially simple and involves few parts, of the type that may be economically fabricated and assembled; and to provide a construction as above, which is foolproof and reliable in operation.

Other features and advantages will hereinafter appear.

In the drawings:

FIG. 1 is an axial sectional view of a releasable pin construction as provided by the invention, securing together two structural parts.

FIG. 2 is a left end elevational view of the releasable pin construction.

FIG. 3 is a right end elevational view.

FIG. 4 is a fragmentary side elevational view of the front end portion of the releasable pin.

FIG. 5 is a transverse section, taken on the line 5—5 of FIG. 1.

FIG. 6 is a sectional view of the locking member of the pin.

FIG. 7 is a side elevational view of the locking member of FIG. 6.

FIG. 8 is a side elevational view of the cam part of the pin construction.

FIG. 9 is an end elevational view of the cam part of FIG. 8.

In FIG. 1, the releasable pin construction is shown as comprising a hollow shank 20 of rectangular cross section, in which there is longitudinally movable a release bar 22. The shank 20 passes through a pair of structural members 24, 26 for the purpose of securing these in assembled relation.

At its right or back end the shank 20 has a head portion 28 in which there is disposed a biasing means or helical compression spring 30 engaged at one end with an internal shoulder 32 of the head portion and at the other end with a finger piece 34 secured to the release bar 22 in any desired fashion.

With such construction, the release bar 22 is continually yieldably urged longitudinally to the right with respect to the shank 20, by the spring 30.

At its front end, the shank 20 has a pair of oppositely disposed slots or openings 36 which are bounded by guiding edges 38, 40 extending in general at right angles to the axis 42 of the pin assemblage.

In the slots 36 are disposed slide plates 44 of a locking member 46, said member also comprising a shouldered connector pin 48 which has its ends headed over to retain the slide plates 44 in fixed operative positions with respect to each other.

The slide plates 44 have abutment portions 50 which are slightly rounded to conform to the rounded configurations of the corner portions of the shank 20.

Secured to the front or foremost end of the release bar 22 is an elongate cam part 52 which may be fabricated from round stock, said part having a threaded axial bore 54 into which the end portion of the release bar is threaded. The cam part 52 has a cut or notch 56 which slopes with respect to the pin axis 42 and is bounded by opposite inner and outer sloping surfaces 58, 60.

In accordance with the present invention, the cam piece 52 has an additional sloping surface 62 which is adapted to act on the connector pin 48 in such a manner, in conjunction with the biasing spring 30, as to eliminate looseness, rattle, etc. of the pin assemblage and also to obviate the necessity for maintaining close and costly dimensional tolerances of the interfitting parts associated with the locking member. The sloping surface 62 meets the sloping surface 60 at an obtuse angle.

The sloping surfaces 58, 60 and 62 may be considered as disposed in planes which make acute angles with respect to the axis 42 of the cam piece and pin assemblage.

The cut 56 is adapted to accommodate the connector pin 48 of the locking member 46 and to act on the said pin for the purpose of advancing and retracting the locking member in directions laterally of the axis 42. In FIGS. 1, 2 and 4 the locking member 46 is illustrated in the advanced or projecting position, wherein it provides interference and prevents removal of the structural member 24 from the pin (or removal of the pin from the members 24, 26).

The sloping surface 62 extends completely to the foremost end of the cam part 52 and, under the action of the biasing spring 30, results in the locking member 46 being normally retained in the projecting or locking position shown.

Referring to FIG. 1, the release bar 22 is shown as being yieldably held in its rightmost position under the action of the spring 30, whereby the sloping cam surface 62 continuously maintains the locking member 46 in the locking, advanced or projected position. By virtue of the slope of the surface 62 a wedging action is established against the connector pin 48, urging the latter against the top wall 20a of the shank 20. The wall 20a thus constitutes a stop for the pin 48, and said pin and the locking member 46 are held against looseness. Also, such action is obtained without requiring closely held tolerances, inasmuch as a degree of latitude is had in the locking position of the release bar 22. Under certain circumstances such release bar may be shifted more to the right, or else more to the left from the position shown for the locking condition, depending on the fullness of the cam part 52 and values of the dimensions of the locking member 46. Accordingly, it is no longer necessary to hold dimensional tolerances to critical costly figures, and at the same time there is had the benefit of elimination of rattle, looseness, etc. The biasing spring 30 is always able to maintain the release bar 22 in the required locking position despite variations (within limits) of the cam part 52 and locking member 46. The spring 30 urges the part 52 in a direction which brings the foremost end of the part closer to the pin 48 and member 46.

In order to release the pin assemblage it is merely necessary to depress the finger piece 34 (shift the same from right to left). This will shift the release bar 22 from right to left as viewed in FIG. 1 and will cause the cam piece 52 to cam inwardly the connector pin 48 and the locking member 46. The releasing position of the locking member 46 comprises a position which is shifted downward from that shown in FIGS. 1, 2 and 4, wherein the abutment portions 50 are flush with the adjoining corner portions of the shank 20, as may be readily understood.

It will now be seen from the foregoing that I have provided a novel and improved releasable pin assemblage wherein looseness and rattle are minimized whereas at the same time there is obviated the necessity for holding tolerances to critical values. Relatively few parts are required, said parts being of simple and economical construction and being easily and quickly assembled. Accordingly, the manufacturing cost is held to a minimum. Moreover, the releasable pin assemblage as above described has been found to be effective and reliable in its operation and not likely to fail or get out of order.

Variations and modifications may be made within the scope of the claims, and portions of the improvements may be used without others.

I claim.

1. A releasable pin assemblage comprising, in combination:
   (a) a shank,
   (b) a release means comprising a finger piece disposed at one location on, and movable with respect to the shank and further comprising a cam part which is movable at another location on, and in a direction along the axis of, the shank,
   (c) a single locking member all portions of which are immovable with respect to each other, said locking member being carried by the shank at said other location and being movable laterally of the axis of the shank between positions thereon wherein abutment portions thereof protrude laterally at the side of the shank or do not protrude at all from the shank,
   (d) said locking member being operatively connected to said cam part to be actuated thereby,
   (e) said shank having guide means engaged with the locking member to guide the latter for said movement and in a path whereby the said abutment portions of the locking member simultaneously move in parallel directions along straight lines from projecting positions to substantially non-projecting, retracted positions on the shank and from said substantially non-projecting, retracted positions to said projecting positions,
   (f) said cam part effecting said guided projecting movement of the locking member in response to movement of the finger piece in one direction, and having a sloping surface engaged with the locking member when the latter is fully projected, said sloping surface being disposed in a plane making an acute angle with the axis of the shank,
   (g) a stop engageable by, and blocking, said locking member against further projecting movement, when the member is fully projected, and
   (h) means biasing the release means to continuously yieldably hold the sloping surface of the cam part in engagement with the locking member and to continuously hold said member against said stop for the projecting position of the locking member, thereby to minimize rattle and looseness of the locking member, and
   (i) said shank having a head enlargement at said one location and adjoining said finger piece.

2. A releasable pin assemblage as in claim 1, wherein:
   (a) the operative connection between the cam part and the locking member comprises a connector pin carried by the member, said cam part having a notch which is sloping with respect to the axis of the pin assemblage, said notch receiving said connector pin for the purpose of actuating the member,
   (b) one wall of said notch meeting said sloping surface of the cam part and making an obtuse angle therewith.

3. A releasable pin assemblage as in claim 2, wherein:
   (a) the cam part is elongate and movable longitudinally in the shank, and
   (b) said sloping surface of the cam part extends to one end thereof,
   (c) said biasing means urging the cam part in a direction which brings said one end closer to the center of the locking member.

References Cited

UNITED STATES PATENTS 3,184,816   5/1965   McCarthy _____ 24—211

BOBBY R. GAY, *Primary Examiner.*

E. SIMONSEN, *Assistant Examiner.*